D. B. Neal,
Hay Fork.
No. 89,938. Patented May 11, 1869.
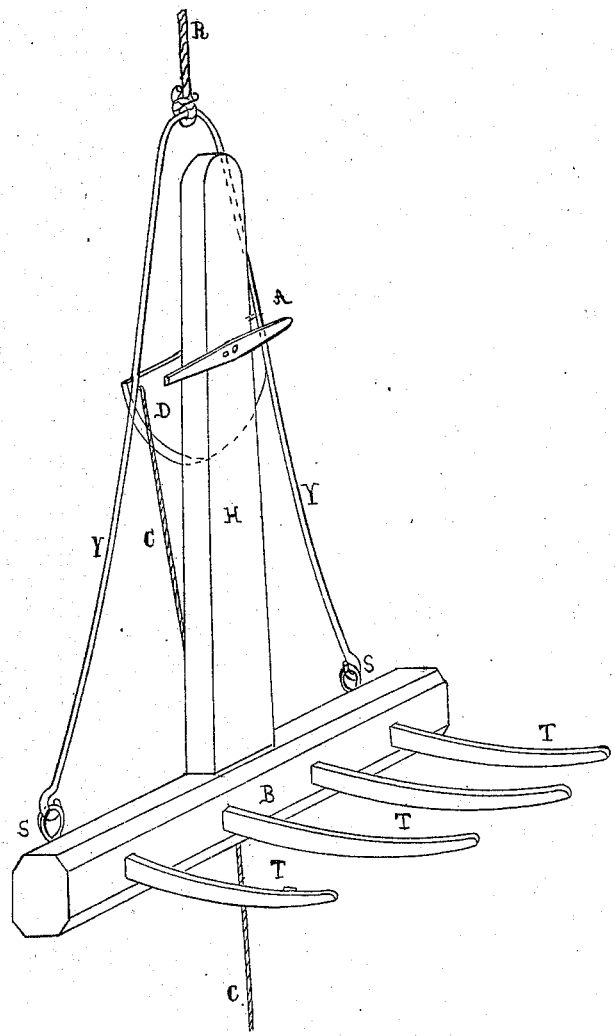

United States Patent Office.

DANIEL B. NEAL, OF MOUNT GILEAD, OHIO, ASSIGNOR TO HIMSELF, W. W. McCLEN-ACKEN, AND E. C. CHASE, OF SAME PLACE.

Letters Patent No. 89,938, dated May 11, 1869.

IMPROVEMENT IN HORSE HAY-FORKS.

The Schedule referred to in these Letters Patent and making part of the same.

To all whom it may concern:

Be it known that I, Dr. DANIEL B. NEAL, of Mount Gilead, in the county of Morrow, and State of Ohio, have invented a new and improved Horse Hay-Fork; and I do hereby declare the following to be a full and correct description of the same, reference being had to the accompanying drawing, which is a perspective view of my improved fork complete.

My invention consists in the device herein described for holding and tripping the fork.

In the accompanying drawing—

T marks the tines of the fork;

B, the back, and

H, the handle of the same.

Staples S S, fixed in the back of the fork, receive the hooked ends of a long V-shaped yoke, Y, which extends up far enough to allow the handle H to pass freely under it.

To the angle of this yoke is attached the hoisting-rope R.

Through the handle H runs a short shaft $a$, to the front end of which is attached the cross-bar A, and to its rear end the semicircular metallic disk D, whose weight acts to keep its own straight side and the bar A in a horizontal position.

When in that position, the disk and bar extend on either side of the handle H, far enough to hold the legs of the yoke Y between them, and thus prevent the handle H from leaving the upright position.

To one corner of disk D is attached the trip-cord C, by pulling which the disk D and bar A are drawn from a horizontal to an inclined or upright position, and the handle H is released from the yoke Y, and left free to fall, in obedience to gravity, and bring the tines T into a position to discharge any load they may have been sustaining.

Having thus fully described my invention,

What I claim, and desire to secure by Letters Patent, is—

In a horse hay-fork, constructed as described, the combination, with the handle H, of the shaft $a$, disk D, bar A, and cord C, constructed, arranged, and operating substantially in the manner specified.

The above specification of my said invention signed and witnessed at Mount Gilead, Ohio, this 31st day of March, A. D. 1869.

DR. DANIEL B. NEAL.

Witnesses:
JOHN DALRYMPLE,
ALLEN DALRYMPLE.